United States Patent
Seeger et al.

(10) Patent No.: US 10,844,242 B2
(45) Date of Patent: Nov. 24, 2020

(54) TWO-COMPONENT PUTTY, METHOD FOR COATING A SUBSTRATE WITH SUCH PUTTY, SUBSTRATES COATED WITH SUCH PUTTY AND USE FOR SUCH PUTTY FOR IMPROVING EROSION RESISTANCE

(71) Applicant: Akzo Nobel Coatings International B.V., Arnhem (NL)

(72) Inventors: Dirk Seeger, Oldenburg (DE); Johannes Felker, Rastede (DE)

(73) Assignee: AKZO NOBEL COATINGS INTERNATIONAL B.V., Arhem (NL)

( * ) Notice: Subject to any disclaimer, the term of this patent is extended or adjusted under 35 U.S.C. 154(b) by 0 days.

(21) Appl. No.: 16/302,437

(22) PCT Filed: May 30, 2017

(86) PCT No.: PCT/EP2017/062957
§ 371 (c)(1),
(2) Date: Nov. 16, 2018

(87) PCT Pub. No.: WO2017/207521
PCT Pub. Date: Dec. 7, 2017

(65) Prior Publication Data
US 2019/0276703 A1    Sep. 12, 2019

(30) Foreign Application Priority Data

May 31, 2016  (EP) .................... 16172084

(51) Int. Cl.
| | | |
|---|---|---|
| *C09D 175/12* | (2006.01) | |
| *C09D 7/62* | (2018.01) | |
| *C08G 18/32* | (2006.01) | |
| *C08G 18/42* | (2006.01) | |
| *C08G 18/66* | (2006.01) | |
| *C08G 18/73* | (2006.01) | |
| *C08J 5/04* | (2006.01) | |
| *C08K 9/06* | (2006.01) | |
| *C09D 5/00* | (2006.01) | |
| *C08G 18/79* | (2006.01) | |
| *C09D 175/06* | (2006.01) | |
| *C08G 18/38* | (2006.01) | |
| *C08G 18/78* | (2006.01) | |
| *C09D 5/34* | (2006.01) | |
| *C09D 175/04* | (2006.01) | |
| *C09D 169/00* | (2006.01) | |

(Continued)

(52) U.S. Cl.
CPC ....... *C09D 175/12* (2013.01); *C08G 18/3234* (2013.01); *C08G 18/3838* (2013.01); *C08G 18/4263* (2013.01); *C08G 18/44* (2013.01); *C08G 18/6651* (2013.01); *C08G 18/73* (2013.01); *C08G 18/7831* (2013.01); *C08G 18/792* (2013.01); *C08J 5/043* (2013.01); *C08J 7/0427* (2020.01); *C08K 9/06* (2013.01); *C09D 5/00* (2013.01); *C09D 5/34* (2013.01); *C09D 7/62* (2018.01); *C09D 169/00* (2013.01); *C09D 175/04* (2013.01); *C09D 175/06* (2013.01); *C08J 2363/00* (2013.01); *C08J 2475/12* (2013.01)

(58) Field of Classification Search
CPC .......... C09D 175/12; C09D 7/62; C09D 5/00; C09D 5/34; C09D 169/00; C09D 175/04; C09D 175/06; C08G 18/3234; C08G 18/3838; C08G 18/4263; C08G 18/44; C08G 18/6651; C08G 18/73; C08G 18/792; C08J 5/043; C08J 7/047; C08J 2363/00; C08J 2475/12; C08K 9/06
USPC ........................................ 427/384
See application file for complete search history.

(56) References Cited

U.S. PATENT DOCUMENTS

| 2008/0249333 A1 | 10/2008 | Evers et al. |
| 2013/0210997 A1 | 8/2013 | Kaune et al. |
| 2017/0044397 A1 | 2/2017 | Muench |

(Continued)

FOREIGN PATENT DOCUMENTS

| CN | 102 585 677 A | 7/2012 |
| CN | 103 724 584 A | 4/2014 |

(Continued)

OTHER PUBLICATIONS

WO-00-24835A1—machine translation (Year: 2000).*

(Continued)

*Primary Examiner* — Ronald Grinsted
(74) *Attorney, Agent, or Firm* — McDonnell Boehnen Hulbert & Berghoff LLP

(57) ABSTRACT

The present invention relates to a two-component putty comprising (1) a base component and (2) a curing component, wherein the base component comprises: —a polycarbonate diol having a hydroxyl number in the range of from 50 to 500 mg KOH/g; —a further resin component having a hydroxyl number of at least 300 mg KOH/g; and —an inorganic filler, wherein the curing component comprises a polyisocyanate, and wherein the amount of the inorganic filler is in the range of from 35 wt % to 60 wt %, based on the total weight of the putty, the putty contains less than 5 wt % of organic solvent, and the viscosity of the putty is in the range of from 30,000 mPa·s to 250,000 mPa·s. The present invention also relates to a method for coating a substrate by applying such putty and allowing the applied putty to cure. The invention further relates to a coated substrate obtainable by such method and the use of such two-component putty for improving erosion resistance of a substrate.

17 Claims, No Drawings

(51) Int. Cl.
*C08G 18/44* (2006.01)
*C08J 7/04* (2020.01)

(56) References Cited

U.S. PATENT DOCUMENTS

| | | |
|---|---|---|
| 2017/0152398 A1 | 6/2017 | Hohnholz et al. |
| 2017/0174933 A1 | 6/2017 | Hohnholz et al. |
| 2017/0204288 A1 | 7/2017 | Seeger et al. |
| 2018/0002566 A1 | 1/2018 | Seeger et al. |

FOREIGN PATENT DOCUMENTS

| | | | |
|---|---|---|---|
| EP | 2 937 368 A1 | 10/2015 | |
| WO | 00/24835 A1 | 5/2000 | |
| WO | WO-0024835 A1 * | 5/2000 | ......... C08G 18/0823 |
| WO | 2007/031534 A1 | 3/2007 | |
| WO | 2010/122157 A1 | 10/2010 | |
| WO | 2012/032133 A1 | 3/2012 | |
| WO | 2015/120941 A1 | 8/2015 | |
| WO | 2015/185367 A1 | 12/2015 | |
| WO | 2016/000845 A1 | 1/2016 | |
| WO | 2016/128166 A1 | 8/2016 | |

OTHER PUBLICATIONS

XP002763782, WPI Week 201438 Thomson Scientific, "Elastic hydroxyl resin for sand erosion-resistant elastic polyurethane coating, comprises filler, ring-opening lactone, cyclohexane lactone, polycarbonate diol and mixed solvent", 2014, 2 pages.

XP002763783, WPI Week 201308 Thomson Scientific, "Paint useful for the blades of wind turbine, comprises polyurethane, polyester ether, a curing agent, an auxiliary agent, a solvent and titanium dioxide", 2012, 2 pages.

Stoye, Dieter, et al. "Resins for Coatings", Chemistry, Properties and Applications, 1996, p. 1,2.

* cited by examiner

TWO-COMPONENT PUTTY, METHOD FOR COATING A SUBSTRATE WITH SUCH PUTTY, SUBSTRATES COATED WITH SUCH PUTTY AND USE FOR SUCH PUTTY FOR IMPROVING EROSION RESISTANCE

This application is the US national phase under 35 U.S.C. § 371 of international application PCT/EP2017/062957, filed May 30, 2017, which claims priority to European application 16172084.2, filed May 31, 2016.

FIELD OF THE INVENTION

The present invention relates to a two-component putty, to a method for coating a substrate with such putty, to a coated substrate obtainable by such method and to the use of such putty for improving erosion resistance of a substrate.

BACKGROUND OF THE INVENTION

In various application areas there is a need for protective coatings fulfilling high mechanical demands. Examples include surfaces of objects that are exposed to erosive substances at high speed, such as rotor blades of wind turbines or helicopters, ship screws, and transport vehicles such as aircraft, trains, automobiles, and ships. Erosion is typically caused by liquid or solid substances, such as airborne sand, rain or hail that impinge on object surfaces. Erosive influences are particularly strong in the edge regions of the objects in question.

Surfaces of objects are typically protected against wear, in particular against erosion, by applying a protective coating or a protective coating system with multiple coating layers, to such surfaces. For effective erosion resistance, it is important to balance coating flexibility or elasticity and coating hardness. Excessive hardness and/or inadequate elasticity tend to be detrimental to effective erosion resistance.

There are various coating materials known which can be used for protecting rotor blades of wind turbines against erosion. Polyurethane-based protective coatings are for example described in WO 2010/122157, WO 2012/032113, and WO 2016/000845.

Despite the protective properties of such coatings, regular repair or maintenance of the coatings is unavoidable. Erosive influences are typically too severe to ensure permanent protection of the objects. The outer coating layer is typically stripped off, thereby exposing underlying coating layers—for example a primer coating or a putty coating—or even the surface of the substrate itself.

Putties are generally applied to sections of an object surface that are particularly exposed and/or sensitive to erosive forces. Putty is usually used to smoothen or cover parts of the object surface that are irregular, or include cracks and recesses. These could for example be sections of the object where various individual components are joined during construction. A putty is also used to cover sections of an object surface that have been damaged, for example by erosion. Such sections also show surface unevenesses and irregularities, which makes them highly sensitive to further erosion.

Sections of an object surface that include edges, corners or recesses, offer points of attack for erosive forces and are therefore very sensitive to erosion. The fact that lightweight construction substrates, typically glass fiber-reinforced plastics, as used in rotor blades for wind turbines, are very brittle, leads to even larger problems.

As soon as putty-filled parts of an object are exposed to its surface, due to wear of outer protective coating layers, there is a risk of rapid wear of the putty coating, since such putty coating is generally not designed for erosion protection. Subsequently severe damage to the object itself may occur.

Therefore, there is a need for a putty that meets the basic requirements of a putty as a filling compound, whilst also exhibiting outstanding erosion resistance.

SUMMARY OF THE INVENTION

The present inventors have found a novel two-component putty that results, after curing, in a putty coating with significantly improved erosion resistance compared to known putty coatings.

Accordingly, the invention provides in a first aspect a two-component putty comprising (1) a base component and (2) a curing component, wherein the base component comprises:
 a polycarbonate diol having a hydroxyl number in the range of from 50 to 500 mg KOH/g;
 a further resin component having a hydroxyl number of at least 300 mg KOH/g; and
 an inorganic filler,
wherein the curing component comprises a polyisocyanate, and wherein the amount of the inorganic filler is in the range of from 35 wt % to 60 wt %, based on the total weight of the putty, the putty contains less than 5 wt % of organic solvent, and the viscosity of the putty as measured by means of a rotary viscometer at a shear rate of $1\ s^{-1}$ and a temperature of 23° C., 30 seconds after having combined and mixed the base component and the curing component, is in the range of from 30,000 to 250,000 mPa·s.

An advantage of the two-component putty of the invention is that it is easy to apply on large objects such as rotor blades of wind turbines or aircrafts. Another advantage is that high temperatures are not necessary for curing. After application to a substrate, the putty according to the invention may be cured at a temperature of at most 80° C.

In a second aspect, the invention further provides a method for coating a substrate comprising applying a putty as hereinbefore defined to a substrate and allowing the applied putty to cure, preferably at a temperature of at most 80° C., more preferably in the range of from 15° C. to 60° C.

In a third aspect, the invention provides a coated substrate obtainable by a method according to the second aspect of the invention. In a final aspect, the invention provides use of a two-component putty according to the first aspect of the invention for improving erosion resistance of a substrate.

The putty of the invention is easy to process into a putty coating. In particular the coatings formed upon curing of the putty of the invention have excellent erosion resistance. The putty is therefore particularly suitable for improving erosion resistance of substrates exposed to severe erosive influences, such as rotor blades or surfaces in aircraft constructions.

DETAILED DESCRIPTION OF THE INVENTION

The present invention relates to a putty. A putty, also called filling compound, is a coating material that is paste-like and has a higher viscosity under processing conditions than typical liquid coating materials.

Due to its paste-like character and high viscosity, a putty is typically used for covering and/or smoothing substantial irregularities, gaps or holes in surfaces. Its high sag resistance ensures that the material does not run from the substrate after application and prior to curing.

A putty typically comprises a relatively high amount of filler and has a high solids content (nonvolatile fraction). As a result, contraction effects during drying and/or curing are minimized. Due to the high amount of putty typically needed for covering and/or smoothing, some visible contraction may nevertheless occur. Therefore, putties are often applied generously and excess material is sanded off after drying and/or curing.

The putty according to the invention is a two-component putty. It comprises a base component (1) and a curing component (2). The individual components (1) and (2) are manufactured and stored separately from each other and are combined shortly before use to obtain the putty. The pot life (the time during which a putty can be applied at a temperature in the range of from 15° C. to 25° C. without the viscosity increasing as a result of crosslinking reactions to an extent that application is no longer possible), depends on the constituents used, in particular the polycarbonate diol, the further resin component, and the polyisocyanate. Typically, the pot life of the putty is in the range of from 0.1 minutes to 10 minutes, preferably of from 0.5 minutes to 5 minutes.

Curing of the two-component putty occurs through chemical reaction of reactive functional groups of the binder constituents in the putty, in particular through reaction of the hydroxyl groups of the polycarbonate diol and of the further resin component with the isocyanate groups of the polyisocyanate. Through these crosslinking reactions a coating film is formed, i.e. a cured coating layer is formed. The term "binder" is used herein in relation to those components of the base component that are primarily responsible for film formation, in particular the polycarbonate diol, the further resin, and the polyisocyanate. The polyisocyanate is also referred to as curing agent or crosslinking agent.

Polycarbonate diols are esterification products which may be formed by reaction of carbonic acid with a polyol. In practice, the carbonate moieties are introduced by means of phosgene or carbonic di-esters, under known reaction conditions. Reaction with a diol, such as for example 3-methyl-1,5-pentanediol or 1,6-hexanediol, then leads to a polycarbonate diol. Polycarbonate diols may include further functional groups, such as ester or ether groups, depending on the type and amount of the starting compounds used. The polycarbonate diol is preferably a linear polycarbonate diol. The polycarbonate diol is preferably a hydroxyl-terminated polycarbonate diol, more preferably a hydroxyl-terminated polycarbonate diol with a terminal hydroxyl group at both ends of a linear polycarbonate diol. The polycarbonate diol is preferably an aliphatic polycarbonate diol, i.e. without aromatic groups, since such groups exhibit significantly restricted UV resistance. A linear, aliphatic polycarbonate diol is particularly preferred.

The polycarbonate diol has an OH number in the range of from 50 to 500 mg KOH/g, preferably of from 100 to 400 mg KOH/g, more preferably of from 150 to 250 mg KOH/g (measured according to DIN 53240).

Since the polycarbonate diol is a diolic component, the OH number and the number-average molecular weight of the polycarbonate diol are dependent on one another. The OH number thus provides information on the number-average molecular weight. A high number-average molecular weight goes hand in hand with a low OH number. The number-average molecular weight may vary widely, for example in the range of from 220 g/mole to 2,250 g/mole (measured by means of GPC analysis with THF (+0.1% acetic acid) as eluent (1 ml/min) on a styrene-divinylbenzene column combination, calibration using polystyrene standards).

Suitable polycarbonate diols are commercially available, for example in the product line DURANOL™ (from Asahi Kasei), Desmophen® (from Bayer MaterialScience AG, Leverkusen, Germany), or Eternacoll® (UBE).

The amount of the polycarbonate diol is preferably in the range of from 5 to 60 wt %, more preferably of from 7.5 to 40 wt %, even more preferably of from 10 to 30 wt %, based on the total weight of the putty.

The putty comprises, in its base component (1), a further resin component with a hydroxyl number of at least 300 mg KOH/g.

The further resin component may be any resin component known to be suitable for coating materials or putties. The further resin component may be a single binder polymer. Alternatively, the further resin component is a mixture of different organic binder compounds, for example a mixture of polymers and/or oligomers with optionally monomeric compounds. The further resin component may for example be a mixture of hydroxy-functional polyether and/or polyester polymers and/or corresponding copolymers with hydroxy-functional monomeric compounds, provided the hydroxyl number is at least 300 mg KOH/g.

A preferred further resin component comprises or consists of (i) a polyhydroxy-functional adduct of an organic primary diamine (e.g. ethylene diamine) and propylene oxide, obtained by reacting a diamine with propylene oxide at such ratio that both N—H bonds of each primary amino group react with propylene oxide in an addition reaction under ring opening of the propylene oxide molecule, and/or (ii) a polyhydroxy-functional adduct as described under (i) that has been subsequently modified by reaction of the hydroxyl groups, formed as a result of the ring opening of a propylene oxide molecule, with an organic compound, for example by esterification with fatty acids. In the preparation of such adducts, one propylene oxide molecule may substitute the hydrogen of an N—H bond. Alternatively, a plurality of propylene oxide molecules may be added by chain extension. Corresponding adducts may be prepared by deliberate adjustment of the reaction conditions. The resulting structure can be verified by determination of the number-average molecular weight and hydroxyl number. An advantage of such components is that, as a result of the existence of the tertiary amino groups in the high-functionality polyols, a catalytic effect is obtained that is sufficient for reaction with isocyanates. Thus, the further resin component functions not only as a crosslinked film-forming component but also as an amine catalyst. Further resin components of this type are commercially available as Neukapol (from Altropol Kunststoff GmbH).

Preferably, the further resin component has an OH number in the range of from 300 to 700 mg KOH/g, more preferably of from 400 to 600 mg KOH/g.

The amount of further resin component is preferably in the range of from 3 wt % to 25 wt %, more preferably of from 4 wt % to 15 wt %, even more preferably of from 5 wt % to 10 wt %, based on the total weight of the putty.

The putty comprises an inorganic filler in an amount in the range of from 35 wt % to 60 wt %. Such fillers are known in the art and include various substances, typically in granular or powder form, which are used for the purpose of achieving particular physical properties of coating compositions. Inorganic fillers include carbonates such as calcium carbonate, dolomite or barium carbonate, sulfates such as calcium sulfate and barium sulfate, and silicates and optionally phyllosilicates such as talc, pyrophyllite, mica, kaolin, feldspar, precipitated calcium, aluminum, calcium/aluminum, sodium/aluminum silicates, mullite, wollastonite, nepheline such as nepheline syenite, and silicon dioxide such as quartz and cristobalite. For the purpose of the present invention, the group of silicates includes silicon dioxide. Other suitable inorganic fillers are precipitated silicas or fumed silicas, and metal oxides such as aluminum hydroxide and magnesium hydroxide.

Preferably, the inorganic filler is modified with an organosilane. The filler to be modified serves as substrate, to which an organosilane is applied. Such coating of fillers may take place under generally known conditions for physisorption and/or chemisorption. It will be appreciated that the extent and nature of the modification depends on the reaction conditions applied and the substrate properties. The coating or modifying process may for example take place in an aqueous medium, optionally in the presence of a catalyst such as an acid or a base, via hydrolysis and subsequent condensation. An example is the hydrolysis of hydrolysable bonds in the organosilane (—Si—OCH$_3$ bond, for example) and the subsequent condensation with hydroxyl groups on the filler surface, such as the hydroxyl groups on a silicate surface.

Organosilanes are compounds derived from pure silanes, i.e. binary compounds consisting of Si and H, in which part of the hydrogen is substituted by an organic radical connected via a carbon atom to the silicon atom.

Organosilanes thus contain at least one Si—C bond. Suitable organic radicals include, for example, pure alkyl radicals or alkyl radicals in which at least one hydrogen residue is substituted by a functional group such as an epoxide group or amino group. In harmony with customary definitions, organosilanes include compounds in which all Si-bonded hydrogen residues present in pure silane are substituted by other radicals, provided there is at least one Si—C bond left. Common radicals by which hydrogen residues are substituted are for example—in addition to the organic radicals described above—hydroxyl groups, alkoxy groups or halogens. Such organosilanes may have a monomeric, oligomeric or polymeric character.

Preferably the organosilane used for the modification of the inorganic filler has the following general formula (I):

$$X_{4-n-m}Si\text{—}R_n(\text{-A-B})_m \qquad (I)$$

where
X=OH, halogen, alkoxy, aryloxy, preferably methoxy or ethoxy;
R=alkyl, preferably C$_1$ to C$_{12}$ alkyl, phenyl or H;
A=a divalent organic radical, preferably a divalent alkylene radical, even more preferably a C$_1$ to C$_6$ alkylene, still more preferably a C$_1$ to C$_3$ alkylene;
B=amino, hydroxyl, epoxy, epoxypropyloxy, hydroxyalkyl, acetoxy, isocyanate, acryloyloxy, methacryloyloxy, imidazole, ureido or vinyl group,
n, m=0, 1, 2 or 3, with n+m 3, preferably 1 n+m 3.

Preferably, the organosilane has at least one group X. Such group is readily hydrolysable in an aqueous medium, and can be linked via a subsequent condensation to a filler surface with hydroxyl groups, such as for example a silicate surface. Preferably X is a methoxy or ethoxy group.

Through an appropriate choice of the modifying organosilane, the filler surface can be adapted. Through the addition of an organosilane, the surface of the inorganic filler is hydrophobized. Thus, the compatibility of the filler with the hydrophobic polymer matrix of the putty is increased, by improving physical adsorption and optionally chemical reaction to the other putty components. As a result, effectiveness of the filler is ensured and the function of the filler to improve the mechanical resistance of putty coatings is fulfilled.

The modification may be carried out with an organosilane that has only alkyl groups (m=0), or with an organosilane with functional groups such as epoxide or amino groups (m>0). Mixtures of different organosilanes may be used.

Alternatively, instead of using an organosilane of formula (I), other organosilanes, such as organosilanes of higher molecular mass, may be used. Such organosilanes are referred to as oligomeric or polymeric organosilanes. Such organosilanes may be formed by condensation of two or more organosilanes of formula (I) via its hydrolysable group X, and then applied to the surface of the inorganic filler, via its further hydrolysable groups. Condensation of monomeric organosilanes may also occur during modification of an inorganic filler with an organosilane of formula (I). Reference herein to an oligomeric organosilane is to an organosilane with on average from two to five identical or different monomeric organosilane moieties, i.e. those containing only one silicon atom. Reference to a polymeric organosilane is to an organosilane with more than five monomeric organosilane moieties.

Examples of suitable organosilanes include: propyltrimethoxysilane, propyltriethoxysilane, isobutyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane, 3-aminopropyltrimethoxysilane, 3-methacryloyloxytrimethoxysilane, 3-glycidyloxypropyltrimethoxysilane, beta-(3,4-epoxycyclohexyl)ethyltrimethoxysilane, gamma-isocyanatopropyltrimethoxysilane, 1,3-bis(3-glycidyloxypropyl)-1,1,3,3,-tetramethyldisiloxane, ureidopropyltriethoxysilane, and their homogeneous and heterogeneous oligomers and polymers. Such organosilanes are obtainable for example under the trade name Dynasylan or Geniosil.

Preferably, the organosilane used contains an epoxide or amino group, more particularly an organic radical containing an epoxide group or an amino group bonded to the silicon atom via a carbon atom. Via these epoxide or amino groups it is possible to tune the polarity profile of the filler and therewith make physical adsorption to the further putty components more effective. Moreover, upon curing of the putty, the thus-modified filler can react with the functional groups of the hydroxyl-containing polycarbonate diol and further resin component and/or of the polyisocyanate. Therewith, the filler can be incorporated more effectively in the network that is formed.

Preferably, the organosilane-modified filler comprises in the range of from 0.2 wt % to 5 wt % organosilane, based on the total weight of the modified filler.

Modified fillers of this kind are commercially available, for example under the trade names Tremin, Treminex, Tremica or Silbond from HPF—The Mineral Engineers.

The particle size of the inorganic filler is not in itself a critical parameter and may be in the range common for fillers, typically of from a few micrometers to a few hundreds of micrometers. Preferably, the average particle size (d$_{50}$) is in the range of from 0.1 μm to 100 μm, more preferably of from 1 μm to 50 μm, as measured by laser diffraction in accordance with ISO 13320:2009).

The amount of inorganic fillers is in the range of from 35 to 60 wt %, preferably of from 40 to 50 wt %, based on the total weight of the putty.

The putty preferably comprises, in base component (1), at least one diamine which has two secondary amino groups and an aliphatic group (d1) between the nitrogen atoms of the two amino groups. The diamine contains exclusively secondary amino groups.

Secondary amino groups possess one hydrogen radical on the nitrogen atom and two organic radicals (or organic groups), which are bonded to the nitrogen atom via a carbon atom. These organic radicals may be any organic radical, provided the amine character of the diamine is retained. The organic radicals may for example be, independently, an alkyl, aryl or alkenyl group, optionally substituted for example with a hydroxyl or a nitrile group. Not possible would be an acyl group positioned alpha to the nitrogen atom, such compound would be an amide instead of an amine.

The organic radicals may comprise bridging heteroatoms or a bridging group containing heteroatoms, provided the amine character is preserved. Examples include ether or ester bonds.

One of the organic radicals is aliphatic group (d1), located between the two nitrogen atoms of the two secondary amino groups. Aliphatic group (d1) is an organic radical for both amino groups. Aliphatic group (d1) may be a linear, branched, or a cyclic alkyl groups. The aliphatic group (d1) is preferably a saturated aliphatic group. Preferably, aliphatic group (d1) has 4 to 30 carbon atoms, more preferably 6 to 18 carbon atoms. Even more preferred is a cyclic aliphatic group (d1) with 6 to 18 carbon atoms. A particularly preferred aliphatic group (d1) has the following formula (II).

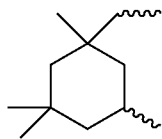

(II)

This radical may be introduced through the use of a corresponding primary diamine isophoronediamine in the preparation of the diamine.

Attached to each of the nitrogen atoms of the diamine is a further organic radical (d2). Organic radicals (d2) may be, independently, aliphatic, aromatic, or araliphatic radicals, optionally substituted. An araliphatic group is a group having both aliphatic and aromatic components. Radicals (d2) preferably contain no aromatic components. Thus, the diamine is preferably free of any aromatic group or component.

Radicals (d2) are preferably alkyl groups, optionally substituted. An example of an unsubstituted alkyl group is a methyl group or a ethyl group. An example of a substituted alkyl group is an ethyl group in which one hydrogen atom is substituted by a nitrile group, such as the radical —$CH_2CH_2$—CN. Another example is an alkyl radical connected via an ester bond to another alkyl radical, such as the substituted radical —$CH_2CH_2$—C(O)—O—$CH_3$. The optionally substituted alkyl group preferably contains 2 to 10 carbon atoms in alkyl units, more preferably 2 to 4. The radical —$CH_2CH_2$—CN contains two carbon atoms in alkyl units; the radical —$CH_2CH_2$—C(O)—O—$CH_3$ contains three carbon atoms in alkyl units, since one of the carbon atom is present in an ester bond.

The diamine may be prepared through the reaction of a primary diamine (containing two primary amino groups and an aliphatic group (d1) between them) with an acrylic acid derivative by conventional nucleophilic addition of the amine to the acrylic carbon-carbon double bond. Such preparation is for example described in WO 2007/031534. The acrylic acid derivative preferably is a $C_1$-$C_6$ alkyl acrylate, more preferably methyl or ethyl acrylate, or acrylonitrile.

Thus, radicals (d2) are preferably selected from the group consisting of —$CH_2CH_2$—CN and —$CH_2CH_2$—C(O)—O—$C_nH_{2n+1}$ with n=1 to 6, preferably n=1 or 2. Especially preferred is the radical —$CH_2CH_2$—CN.

A particularly preferred diamine is described by the following formula (III):

$$(d2)\text{-NH-}(d1)\text{-NH-}(d2) \qquad (III)$$

where
(d1)=aliphatic group having 4 to 30 carbon atoms, especially preferably a cycloaliphatic group having 6 to 18 carbon atoms, very preferably aliphatic group of the formula (II),
(d2)=independently at each occurrence, —$CH_2CH_2$—CN and/or —$CH_2CH_2$—C(O)—O—$C_nH_{2n+1}$ with n=1 to 6, preferably —$CH_2CH_2$—CN.

The diamine preferably has an amine number in the range of from 300 to 500 mg KOH/g, more preferably of from 350 to 450 mg KOH/g (measured by means of DIN EN ISO 15880).

Since the diamine has two amino groups, the amine number and the molecular weight are dependent on each other, and the amine number provides information on the molecular weight. A high molecular weight goes hand in hand with a low amine number.

The amount of any diamine is preferably in the range of from 0.1 to 5.0 wt %, more preferably of from 0.2 to 2.0 wt %, even more preferably of from 0.3 to 1.0 wt %, based on the total weight of the putty.

The putty may comprise, typically in its base component (1), further components generally known as constituents for coating compositions, such as solvents, pigments or additives.

The putty may include organic solvents and/or water. A particular advantage, however, is that the putty can be produced in solvent-free form. The putty contains less than 5 wt % of organic solvent, preferably less than 3 wt %, more preferably less than 1.0 wt %, based on the total weight of the putty. The putty preferably contains no or only minor amounts of water. Preferably, the putty contains less than 1.0 wt %, more preferably less than 0.2 wt %, even more preferably less than 0.01 wt % of water, based on the total weight of the putty. Organic solvent or water is preferably not explicitly added, e.g. to adjust the viscosity of the putty, but merely present, if at all, in small amounts as part of typical coating additives.

The putty may comprise a catalyst for the catalysis of the reaction of hydroxyl groups with isocyanate groups. The putty preferably contains 0.01 to 2 wt %, based on the total weight of the putty, of such catalyst. Suitable catalysts are the known in the art and include metal catalysts such as tin, molybdenum, zirconium or zinc catalysts and amine catalysts such as 2-(2-dimethylaminoethoxy) ethanol. Particularly suitable catalysts are tin compounds such as dialkyltin dicarboxylates, in particular dimethyltin dilaurate, dibutyltin dilaurate.

The putty may comprise typical additives such as antioxidants, de-aerating agents, wetting agents, dispersants, adhesion promoters, rheology modifiers such as thickeners, waxes and wax like compounds, biocides, matting agents, radical scavengers, light stabilizers or flame retardants. Additives may be present in customary amounts, typically in the range of from 0.1 to 10 wt % based on the total weight of the putty.

The putty may comprise soluble dyes, color pigments, or further catalysts.

The putty preferably comprises in the range of from 0.5 to 5 wt %, based on the total weight of putty, of a polyol having two, three, four or five hydroxyl groups, more preferably a diol. Preferred in this context is 2-ethylhexane-1,3-diol.

The two-component putty comprises—in curing component (2)—a polyisocyanate.

Polyisocyanates are organic compounds having on average more than one isocyanate group per molecule and are known in the art. The polyisocyanate may be aliphatic or aromatic. Di-isocyanates, and dimers or trimers of di-isocyanates, such as uretdiones and isocyanurates or biurets, are preferred. The polyisocyanate may for example be hexamethylene di-isocyanate, octamethylene di-isocyanate, decamethylene di-isocyanate, dodecamethylene di-isocyanate, tetradecamethylene di-isocyanate, trimethylhexane di-isocyanate, tetramethylhexane di-isocyanate, isophorone di-isocyanate (IPDI), 2-isocyanatopropylcyclohexyl isocyanate, dicyclohexylmethane 2,4'-di-isocyanate, dicyclohexylmethane 4,4'-di-isocyanate, 1,4- or 1,3-bis(isocyanatomethyl)cyclohexane, 1,4- or 1,3- or 1,2-di-isocyanato-cyclohexane, and 2,4- or 2,6-di-isocyanato-1-methylcyclohexane, or a dimer or trimer thereof, or a mixture of two or more thereof. Uretdiones and isocyanurates or biurets are particularly preferred. Preferred polyisocyanates are hexamethylene di-isocyanate, isophorone di-isocyanate, mixtures thereof, and its various trimers and dimers. The polyisocyanate may be a modified polyisocyanate, such as for example a polyether-modified and/or polyester-modified polyisocyanate. The isocyanate groups in these components may be free or may be blocked with known blocking agents. Preferably the isocyanate groups are non-blocked, i.e. free, isocyanate groups.

Particularly preferred is a polyisocyanate containing a biuret group. The polyisocyanate containing a biuret group is preferably an aliphatic polyisocyanate. The aliphatic polyisocyanate containing a biuret group may be obtained from 1,6-hexamethylene di-isocyanate (HDI), 1,3-cyclohexyl di-isocyanate, 1,4-cyclohexyl di-isocyanate (CHDI), diphenylmethane di-isocyanates, 2,2,4- and/or 2,4,4-trimethyl-1,6-hexamethylene di-isocyanate, dodecamethylene di-isocyanate, isophorone di-isocyanate (IPDI), by oligomerization with biuret formation. Three molecules of HDI react for example with one molecule of water, with elimination of one molecule of carbon dioxide, to yield an HDI biuret.

Particularly preferred is a biuret of an aliphatic polyisocyanate based on isophorone di-isocyanate and/or hexamethylene di-isocyanate, more in particular the biuret of hexamethylene di-isocyanate.

The polyisocyanate preferably has an isocyanate content in the range of from 5.8% to 27%, more preferably of from 15% to 26%, even more preferably of from 20% to 26%. The isocyanate content is determined in accordance with DIN EN ISO 11909 by reacting the polyisocyanate with excess dibutylamine and back-titrating with hydrochloric acid against bromophenol blue.

The amount of polyisocyanate is preferably in the range of from 10 to 60 wt %, more preferably of from 15 to 45 wt %, even more preferably of from 20 to 30 wt %, based on the total weight of the putty.

The solids content of the putty is preferably more than 90%, more preferably more than 95%, even more preferably more than 99%.

Reference herein to solids content (non-volatile fraction) is to the weight fraction which remains as a residue upon evaporation under specified conditions (according to DIN EN ISO 3251; evaporating at 130° C. for 60 minutes).

The viscosity of the putty, as measured by means of a rotary viscometer at a shear rate of 1 s$^{-1}$ and a temperature of 23° C. (see DIN 53019), 30 seconds after having combined and mixed the base component and the curing component, is in the range of from 30,000 mPa·s to 250,000 mPa·s, preferably of from 40,000 mPa·s to 200,000 mPa·s, more preferably of from 50,000 mPa·s to 150,000 mPa·s.

In one preferred embodiment the putty of the invention comprises
  7.5 to 40 wt % of a polycarbonate diol having an hydroxyl number in the range of from 100 to 400 mg KOH/g;
  4 to 15 wt % of a further resin component having a hydroxyl number in the range of from 400 to 600 mg KOH/g; and
  10 to 60 wt % polyisocyanate, preferably a biuret-containing polyisocyanate,
wherein all wt % are based on the total weight of the putty. Preferably, the putty of this embodiment has a viscosity in the range of from of 40,000 to 200,000 mPa·s (as measured by means of rotary viscometer under a shearing load of 1 s$^{-1}$ at a temperature of 23° C., 30 seconds after having combined and mixed the base component and the curing component).

Within this preferred embodiment, all preferred features described hereinabove, are likewise preferred features. Thus, the preferred embodiment may be combined with any one or any combination of features described above.

The molar ratio of the total of any hydroxyl groups and any amino groups in base component (1) to any isocyanate groups in curing component (2) is preferably in the range of from 1.0/0.9 to 1.0/1.5.

Preferably, the two-component putty contains one polycarbonate diol having a hydroxyl number in the range of from 50 to 500 mg KOH/g and one polyisocyanate.

All preferred features mentioned herein are preferred as such and in combination with other preferred features. Preferred embodiments and features described in connection with the first aspect of the invention (the putty) also apply to further aspects of the invention, i.e. the method for coating a substrate, the coated substrate and use of the putty.

In a second aspect, the invention relates to a method for coating a substrate. The method comprises application of the putty according to the invention to a substrate. Application may take place by way of customary automated techniques, using conventional putty application equipment. Alternatively, the putty may be applied manually using a metal or plastic spatula.

In order to produce a cured coating, the applied putty is allowed to cure, preferably at a temperature of at most 80° C., more preferably at most 60° C., even more preferably in the range of from 15 to 60° C., still more preferably of from 15 to 50° C.

The duration required for complete curing varies greatly with the curing temperature selected, and is typically in the range from 30 minutes to ten days. Curing may for example require 30 minutes at a curing temperature of 40° C. to 60° C., or seven days at a curing temperature of 15 to 25° C.

For curing, customary thermal curing equipment and techniques may be used such as a tunnel oven, a radiant NIR and IR heat source, a blower or blowing tunnel. Such equipment and techniques may be combined.

Depending on whether only minor unevenesses or relatively deep gaps or cracks in the substrate are to be covered, the dry film thickness of the cured putty coating may vary between several hundreds of micrometers and several centimeters.

The putty may be applied to any substrate. The substrate may be a single material or composed of various materials. The substrate preferably is a metal substrate such as steel or aluminum or a plastic substrate, more preferably a fiber-reinforced plastic substrate. Epoxy resin-based plastic substrates, in particular fiber-reinforced epoxy resin-based plastic substrates, are particularly preferred. Suitable fibers for reinforcement are glass fiber, aramid fiber and/or carbon fiber, or natural fibers such as hemp or sisal. Preferred substrates are glass fiber-reinforced epoxy resin based plastic substrates. The substrate may have any desired size and shape. Preferred substrates are rotor blades of wind turbines.

The putty is preferably applied to regions of the substrate that are uneven or comprise gaps and recesses.

Preferably, the putty is applied directly to the substrate. Thus, the putty coating formed by applying and curing the putty is in direct contact with the substrate; no further coating layer is applied between substrate and putty coating A further coating layer may be applied to the putty coating, for example a surfacer or an erosion-resistant top coating, to produce a multicoat coating system.

The invention further relates to a coated substrate obtainable by the method according to the second aspect of the invention. The invention further relates to the use of the putty of the invention for improving the erosion resistance of a substrate.

The present invention is further illustrated with the following non-limiting examples.

Examples

1. Test Methods
1.1 General Remarks

For laboratory determination of erosion resistance, a variety of equipment can be used that moves the coated substrate to be tested through an erosion medium or wherein the substrate is fixed and erosion medium flows around it. A stationary test specimen can for example be tested using high-pressure water jetting as typically used for water jet cutting. The erosion effect is controlled by water pressure, distance from the test specimen, and type and size of the nozzles. The effect can be intensified by the use of sand, corundum or silicon carbide. Alternatively, sand blasting or steam blasting may be used, wherein pressure, nozzle size, and distance from the test specimen may likewise be used to control the erosion effect and adapt it to realistic conditions.

In rain erosion tests for moving test specimen, the coated substrate is attached to a rotor or a disk and is radially moved through a curtain of water droplets or of mixtures of water droplets and salt or sand. The most common test scenario used in the wind energy industry operates with velocities of 140 m/s and a rain volume of 30 l/h. In the airplane industry, velocities of up to 220 m/s are used, with a comparable rain volume. The test for rain erosion resistance may be carried out in accordance with ASTM G 73.

1.2 Test Conditions

Rain erosion resistance was tested in accordance with ASTM G 73. Test specimens were spun with a velocity of 140 m/s through a curtain of water droplets. The rain volume was kept constant at 30 l/h. The droplet size of the applied "rain" was on average 5-6 mm. The test was carried out at a temperature of 20 to 25° C. The test specimens were visually evaluated at time intervals of 15 minutes. The erosion resistance corresponds to the time until the bare substrate was visible through the putty coating.

2. Production of Putties and Coated Substrates

The base component and curing component of various putties (I=according to the invention; C=comparative) were prepared by combining the respective constituents and homogeneously mixing them in a dissolver (see table 1 for the composition of the putties). The respective base components and the respective curing components were then homogeneously mixed in the proportions stated in the table. At 30 seconds after combining and mixing of base component (1) and curing component (2), all putties had a viscosity of about 100,000 mPa·s as measured by rotary viscometer under a shearing load of 1 s$^{-1}$ and at a temperature of 23° C. (DIN 53019).

Immediately after its preparation, the putty was directly applied (manually with a spatula) to a glass-fiber reinforced epoxy resin based test specimen. Curing took place by storage during seven days at a temperature of 20 to 25° C. The dry film thickness was 1,000 micrometers.

The rain erosion resistance of the putty coatings thus formed was investigated. The results are shown in table 2.

TABLE 1

Putty composition (all constituents in wt %)

| Constituent | Wt % | | |
|---|---|---|---|
| | I1 | I2 | C1 |
| Paint base component | | | |
| Linear aliphatic polycarbonate diol, terminal hydroxyl, groups solvent-free, OH number = 225 mg KOH/g | 17.5 | | |
| Linear aliphatic polycarbonate diol, terminal hydroxyl groups, solvent-free, OH number = 172 mg KOH/g | | 17.5 | |
| Further resin component, OH number = 530 mg KOH/g | 11.0 | 11.0 | |
| Diamine[1], amine number = 415 mg KOH/g | 0.5 | 0.5 | |
| Mixture of polyester polyols | | | 28.0 |
| Additive mixture | 4.5 | 4.5 | 5.48 |
| Molecular sieve | | | 5.0 |
| Color pigment | 6.0 | 6.0 | 6.0 |
| Filler, not organosilane-modified | | | 55.52 |
| Filler, partially organosilane-modified | 60.0 | 60.0 | |
| Total base paint | 100 | 100 | 100 |
| Curing component | | | |
| HDI trimer containing biuret groups (NCO content 22.0%) | 33 | 33 | |
| HDI-based polyisocyanate (NCO content 21.8%) | | | 40.0 |
| Total | 133 | 133 | 140 |

[1]Adduct of one equivalent of isophoronediamine and 2 equivalents of acrylonitrile.

TABLE 2

Rain erosion test results

| | I1 | I2 | C1 |
|---|---|---|---|
| Rain erosion test duration | 240 minutes | 240 minutes | 60 minutes |

It can be seen in table 2 that the putty coatings formed by applying the putty of the invention exhibit a very good erosion resistance.

The invention claimed is:

1. A two-component putty comprising (1) a base component and (2) a curing component,
wherein the base component comprises,
   a polycarbonate diol having a hydroxyl number in the range of from 50 to 500 mg KOH/g;
   a further resin component having a hydroxyl number of at least 300 mg KOH/g; and
   an inorganic filler,
wherein the curing component comprises a polyisocyanate,
and wherein the amount of the inorganic filler is in the range of from 35 wt % to 60 wt %, based on the total weight of the putty, the putty contains less than 5 wt % of organic solvent, and the viscosity of the putty as measured by means of a rotary viscometer at a shear rate of $1\ s^{-1}$ and a temperature of 23° C., 30 seconds after having combined and mixed the base component and the curing component, is in the range of from 30,000 mPa.s to 250,000 mPa.s.

2. The two-component putty according to claim 1, wherein the polycarbonate diol is a linear, aliphatic polycarbonate diol.

3. The two-component putty according to claim 1, wherein the further resin component has an OH number in the range of from 300 to 700 mg KOH/g.

4. The two-component putty according to claim 1, wherein the polyisocyanate is an aliphatic polyisocyanate containing a biuret group.

5. The two-component putty according to claim 1, wherein the inorganic filler is modified with an organosilane.

6. The two-component putty according to claim 1, wherein the viscosity of the putty is in the range of from 40,000 mPa·s to 200,000 mPa·s.

7. The two-component putty according to claim 1, comprising,
   7.5 to 40 wt % of a polycarbonate diol having a hydroxyl number in the range of from 100 to 400 mg KOH/g;
   4 to 15 wt % of a further resin component having a hydroxyl number in the range of from 400 to 600 mg KOH/g; and
   10 to 60 wt % polyisocyanate.

8. A method for coating a substrate comprising,
   applying a two-component putty according to claim 1 to a substrate; and
   allowing the applied putty to cure.

9. The method according to claim 8, wherein the putty is applied directly to the substrate.

10. The method according to claim 8, wherein the substrate is a plastic substrate.

11. The two-component putty according to claim 1, wherein the further resin component has an OH number in the range of from 400 to 600 mg KOH/g.

12. The two-component putty according to claim 1, wherein the viscosity of the putty is in the range of from 50,000 mPa·s to 150,000 mPa·s.

13. The two-component putty according to claim 7 where the polyisocyanate is a biuret-containing polyisocyanate.

14. The method according to claim 8 wherein the applied putty is allowed to cure at a temperature of at most 80° C.

15. The method according to claim 8 wherein the applied putty is allowed to cure at a temperature in the range of from 15° C. to 60° C.

16. The method according to claim 8, wherein the substrate is an epoxy resin-based plastic substrate.

17. The method according to claim 8, wherein the substrate is a fiber-reinforced epoxy resin-based plastic substrate.

* * * * *